United States Patent
Hakim et al.

(10) Patent No.: US 8,665,148 B2
(45) Date of Patent: Mar. 4, 2014

(54) GLOBAL POSITIONING SYSTEM RECEIVER WITH PHASE OFFSET COMPENSATION

(75) Inventors: Joseph Hakim, Boulder Creek, CA (US); Matt A. Mow, Cupertino, CA (US)

(73) Assignee: Apple Inc., Cupertino, CA (US)

(*) Notice: Subject to any disclaimer, the term of this patent is extended or adjusted under 35 U.S.C. 154(b) by 389 days.

(21) Appl. No.: 13/098,068

(22) Filed: Apr. 29, 2011

(65) Prior Publication Data

US 2011/0273331 A1     Nov. 10, 2011

Related U.S. Application Data

(60) Provisional application No. 61/332,161, filed on May 6, 2010.

(51) Int. Cl.
*G01S 19/23*     (2010.01)
*G01S 19/36*     (2010.01)

(52) U.S. Cl.
CPC     *G01S 19/23* (2013.01); *G01S 19/36* (2013.01)
USPC ............................ 342/357.62; 342/357.76

(58) Field of Classification Search
CPC ........ G01S 19/23; G01S 19/235; G01S 19/36
USPC ........................................ 342/357.62, 357.76
See application file for complete search history.

(56) References Cited

U.S. PATENT DOCUMENTS

| | | | |
|---|---|---|---|
| 6,002,363 A | 12/1999 | Krasner | |
| 6,097,974 A * | 8/2000 | Camp et al. | 455/575.7 |
| 6,483,456 B2 * | 11/2002 | Huisken | 342/357.62 |
| 6,650,879 B1 * | 11/2003 | Underbrink | 455/255 |
| 7,155,183 B2 * | 12/2006 | Abraham | 455/192.1 |
| 7,542,727 B2 * | 6/2009 | Forrester | 455/73 |
| 7,605,757 B1 * | 10/2009 | Gribble et al. | 342/385 |
| 7,688,261 B2 | 3/2010 | DiEsposti | |
| 2005/0041724 A1 | 2/2005 | Chansarkar | |
| 2007/0241956 A1 * | 10/2007 | Jin | 342/357.1 |
| 2011/0003602 A1 | 1/2011 | Kim et al. | |

* cited by examiner

*Primary Examiner* — Gregory C Issing
(74) *Attorney, Agent, or Firm* — Treyz Law Group; G. Victor Treyz; Jason Tsai

(57) ABSTRACT

An electronic device such as a cellular telephone may include transceiver circuitry for handling wireless communications. The transceiver circuitry may include a transceiver such as a cellular telephone transceiver or a wireless local area network receiver and may include a satellite positioning system receiver. Radio-frequency circuitry may be used to couple the transceiver circuitry to antenna structures. When operating the transceiver in different modes of operation, the radio-frequency circuitry may be adjusted to optimize performance. Adjustments to the radio-frequency circuitry may impose phase offsets on satellite positioning system signals that are received through the antenna structures and radio-frequency circuitry. These phase offsets which would otherwise cause degradation in the satellite positioning system receiver can be compensated by applying stored compensating phase offset values to the satellite positioning system receiver during operation.

21 Claims, 3 Drawing Sheets

GLOBAL POSITIONING SYSTEM RECEIVER WITH PHASE OFFSET COMPENSATION

This application claims the benefit of provisional patent application No. 61/332,161, filed May 6, 2010, which is hereby incorporated by reference herein in its entirety.

BACKGROUND

Electronic devices often contain wireless communications capabilities. For example, portable electronic devices are often provided with wireless local area network (WLAN) communications circuitry and cellular telephone communications circuitry. Using wireless communications circuits such as these, a user may communicate with local and remote wireless networks. With a cellular telephone, for example, a user may download data wirelessly or may make a voice call.

Location-based services such as map-based applications are often of interest for users of portable wireless electronic devices. One way in which to provide a device with location awareness is using Global Positioning System (GPS) technology. A GPS system uses a number of satellites in earth orbit. Each satellite emits GPS signals using a GPS carrier at 1575 MHz. Devices that have GPS receivers are able to process the GPS signals to obtain time and position information.

A conventional electronic device can include transceiver circuitry (i.e., cellular telephone circuitry and WLAN circuitry) and a GPS receiver that transmit and/or receive wireless signals using shared antenna circuitry. As the shared antenna circuitry is operated in different bands, the GPS receiver may experience different amounts of phase offsets.

SUMMARY

An electronic device may have wireless communications circuitry for handling wireless communications. The wireless communications circuitry may include transceiver circuitry. The transceiver circuitry may include a transceiver for communicating with external equipment such as cellular network equipment and wireless local area network equipment. The transceiver circuitry may also include a satellite navigation system receiver such as a Global Positioning System (GPS) receiver.

Adjustable radio-frequency (RF) circuitry and antenna structures may be coupled to the transceiver circuitry. For example, a single antenna may be shared by the transceiver and the satellite navigation system receiver. To optimize RF and antenna performance as the transceiver is operated in different bands or is otherwise adjusted, the adjustable RF circuitry may be adjusted in real time. The satellite navigation system receiver may receive satellite navigation system signals through the same RF circuitry that is used to couple the transceiver to the antenna. As a result, adjustments to the adjustable RF circuitry may lead to shifts in the phase of the satellite navigation system signals as seen by the satellite navigation system receiver. Compensating phase offset values can be applied to the satellite navigation system receiver each time the adjustable RF circuitry is adjusted. The compensating phase offset values can compensate for the phase shifts in the satellite navigation system signals and can thereby ensure proper operation of the satellite navigation system receiver even when the adjustable RF circuitry is adjusted.

Further features of the invention, its nature and various advantages will be more apparent from the accompanying drawings and the following detailed description of the preferred embodiments.

DETAILED DESCRIPTION

Electronic devices may use wireless communications circuitry to support communications with wireless local area networks, cellular telephone base stations, peer devices, and other wireless equipment.

To support location-based functions, the wireless communications circuitry in an electronic device may be provided with satellite positioning circuitry such as Global Positioning System (GPS) circuitry. For example, a cellular telephone, portable computer, or other portable device may include a GPS receiver for determining the location of the device.

The Global Positioning System includes a number of GPS satellites that orbit the earth. Each satellite broadcasts GPS signals. The signals include precisely timed codes that are unique to each satellite. The codes are formed by modulating a GPS carrier signal at 1575 MHz using a phase-shift keying (PSK) modulation scheme. Wireless electronic devices may include GPS receivers for receiving and processing the modulated GPS carrier signals. By processing GPS signals in this way, a device is able to obtain information on the current position of the device.

To ensure that GPS position data from a GPS receiver is accurate, interference sources should be avoided. For example, care should be taken to avoid introducing undesired phase shifts in the received GPS carrier signal when adjusting wireless communications circuitry in a device. In some situations, it may be desirable to allow a phase shift to be produced, provided that a compensating phase shift offset is simultaneously made.

For example, if the same antenna is used by the GPS receiver and a wireless transceiver (e.g., a cellular telephone or wireless local area network transceiver), GPS carrier signal phase shifts may be produced when adjusting the wireless communications circuitry to optimize the operation of the transceiver. These adjustments may result in a GPS carrier signal phase shift when the GPS carrier signal passes through the wireless communications circuitry. To prevent this phase shift from interfering with the ability of the GPS receiver to accurately detect its position, the GPS receiver may be provided with phase offset compensation circuitry. The phase offset compensation circuitry can be used to make real time phase shift corrections that counteract any undesired phase offsets produced by adjustments to the wireless communications circuitry. If desired, the phase offset compensation circuitry can also be used to make real time phase shift corrections that counteract undesired variations (e.g., temperature variations, voltage variations, etc.) during operation of the device.

Figure 1:
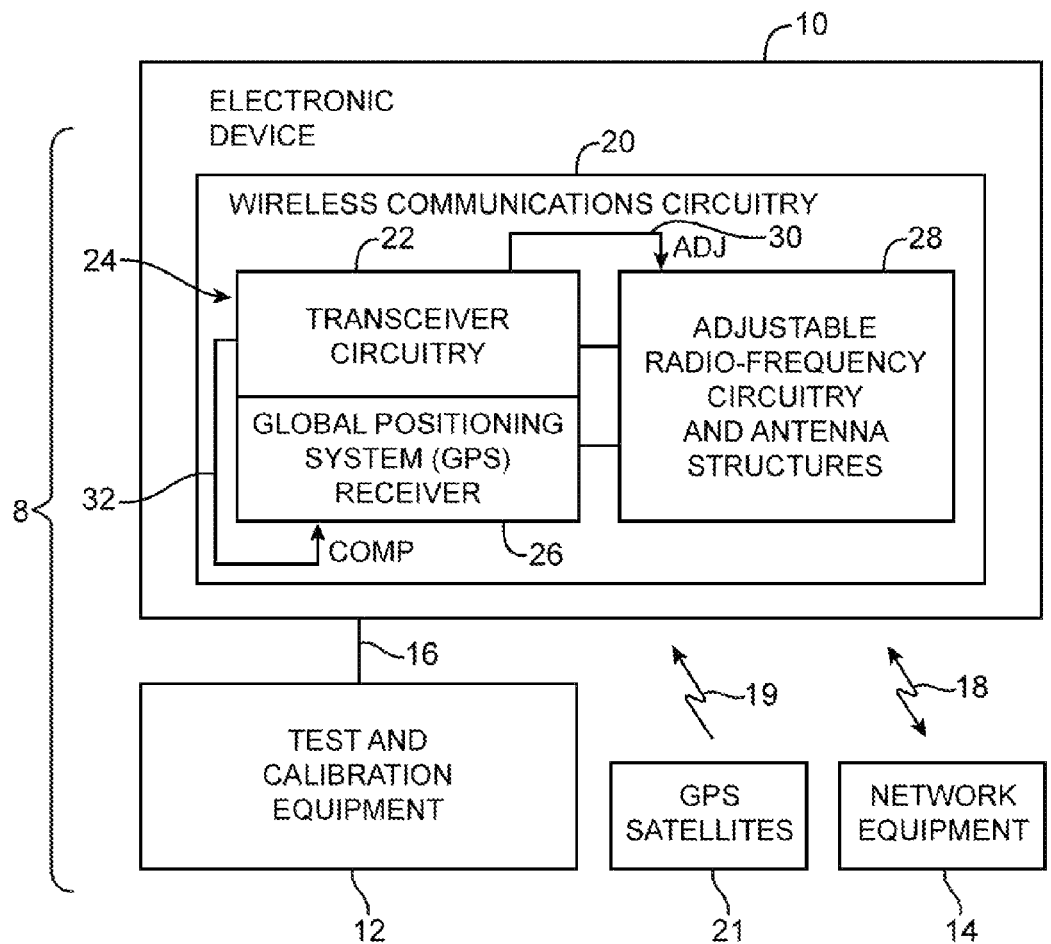
FIG. 1 is a schematic diagram showing how an electronic device may be tested and calibrated and may be used to communicate wirelessly with network equipment in accordance with an embodiment of the present invention.

A circuit diagram of a system containing an electronic device of the type that may include a GPS receiver with phase compensation circuitry is shown in FIG. 1. As shown in FIG. 1, system 8 may include electronic device 10. Electronic device 10 may include wireless communications circuitry 20. Examples of electronic devices such as device 10 that may include wireless communications circuitry 20 include desktop computers, computer monitors, computer monitors containing embedded computers, wireless computer cards, wireless adapters, televisions, set-top boxes, gaming consoles, routers, or other electronic equipment. If desired, wireless communications circuitry 20 may be used in portable electronic devices such as laptop computers, tablet computers, and small portable computers of the type that are sometimes referred to as handheld computers. Wireless communications circuitry 20 may be also be used in wireless electronic devices such as cellular telephones and media players and in small devices such as wrist-watch devices, pendant devices, headphone and earpiece devices, and other wearable and miniature devices.

Wireless electronic device 10 may communicate with wireless equipment 14. Equipment 14 may be, for example, network equipment such as a cellular telephone base station that is used in supporting voice calls and data connections. Equipment 14 may also be local area network equipment that supports protocols such as the IEEE 802.11 wireless local area network protocols. Wireless communications between device 10 and equipment 14 may use wireless link 18.

During testing and calibration operations, device 10 may be connected to equipment such as test and calibration equipment 12 using wired and wireless links (e.g., link 16). For example, a wired or wireless link may be used to characterize the radio-frequency performance of the antennas and transceiver circuits in device 10 during testing. Individual test results or test results from a population of multiple devices may be used in determining appropriate calibration (phase offset) settings to store in device 10. During manufacturing, equipment 12 (e.g., memory loading equipment) may be used to load calibration settings into device 10. During normal operation of device 10, device 10 may communicate wirelessly with network equipment 14 and may receive GPS signals 19 from multiple GPS satellites 21.

Wireless communications circuitry 20 may include Global Positioning System receiver 26 for receiving GPS signals 19 at the GPS frequency of 1575 MHz. Wireless communications circuitry 20 may include transceiver circuitry 22 for handling communications in communications bands other than the GPS band. Transceiver circuitry 22 may, for example, handle cellular telephone communications (e.g., communications in cellular bands at 800, 900, 1800 1900, and 2100 MHz) or wireless local area network communications (e.g., in bands at 2.4 GHz or 5 GHz).

If desired, transceiver circuitry 24 (e.g., a cellular telephone transceiver or other transceiver 22) and GPS receiver 26 may be implemented using a single integrated circuit (e.g., a baseband processor integrated circuit 24). Because circuitry 24 includes both transmitter circuitry (e.g., transmitters in transceiver 22) and receiver circuitry (e.g., receivers in transceiver circuitry 22 and in GPS receiver 26), circuitry 24 may sometimes be collectively referred to as transceiver circuitry.

Transceiver circuitry 24 may include or be associated with circuits such as amplifiers. For example, low noise amplifiers (LNAs) may be used to amplify incoming signals and power amplifiers may be used to amplify outgoing signals.

Transceiver circuitry 24 (e.g., a baseband processor) may include storage and processing circuitry and may communicate with other storage and processing circuitry in device 10. Storage may be used to store software code for device 10. Processing circuitry may be used in generating control signals. For example, processing circuitry in transceiver circuitry 24 may be used to generate control signals ADJ on path 30 that are applied to adjustable radio-frequency (RF) circuitry and antenna structures 28 to configure adjustable RF circuitry and antenna structures 28 in real time during operation in system 8. The adjustments that are made to adjustable RF circuitry and antenna structures 28 may produce phase offsets in the received version of GPS signal 19 at receiver 26 (i.e., phase offsets in the GPS carrier at 1575 MHz). Accordingly, processing circuitry in transceiver circuitry 24 may be used to simultaneously generate control signals COMP on path 32 in real time that direct GPS receiver 26 to internally produce compensating phase offsets. The use of phase compensation circuitry in GPS receiver 26 may allow GPS receiver 26 to produce accurate GPS location data even when adjustments to adjustable RF circuitry and antenna structures 28 result in phase offsets.

Adjustable RF circuitry and antenna structures 28 may include one or more antennas. The antenna structures that are used in device 10 may be based on patch antenna structures, inverted-F antenna structures, planar inverted-F antenna structures, loop antenna structures, monopoles, dipoles, or other suitable antennas. In some situations, it may be desirable to minimize antenna structure volume and simplify transmission line layouts in device 10 by sharing an antenna structure between multiple transceiver circuits. For example, it may be desirable for wireless communications circuitry 20 to include a single antenna (or a network of antennas) that is shared between an cellular radio (i.e., transceiver circuitry 22) and a GPS receiver (i.e., receiver 26). Adjustable RF circuitry (shown as circuitry 28 in FIG. 1) may be interposed between the antenna and transceiver 24. The RF circuitry may be formed from fixed and variable inductors, fixed and variable resistors, fixed and variable capacitors, radio-frequency switches, wavelength-dependent filters (e.g., triplexers), etc.

Adjustments to the switches or other adjustable components in the adjustable RF circuitry (e.g., in response to control signal ADJ) may be made during operation of device 10. For example, as device 10 is moved (e.g., to different cells in a cellular network) or is otherwise exposed to changes in its environment, it may be desirable to make adjustments to the antenna structures and/or RF circuitry in device 10 to ensure that signals for transceiver 22 are always being transmitted and received with optimum efficiency. These changes (e.g., impedance adjustments to RF circuitry by making path adjustments using radio-frequency switches) may be made to optimize performance of transceiver 22 as transceiver 22 switches between different communications bands, but may inadvertently impose phase changes on other signals that are passing through circuitry 28 such as GPS signals 19. As a result, the changes that are made to circuitry 28 in response to changes in control signals ADJ may give rise to corresponding phase changes (phase offsets) in the GPS signals received by GPS receiver 26. These phase offsets can be compensated for by simultaneously issuing corresponding phase offset adjustment commands COMP on path 32 and by adjusting phase compensation circuitry within GPS receiver 26 accordingly. If desired, the phase offset adjustment commands COMP may also be tuned in real time to compensate for operational variations such as temperature variations, voltage variations, etc.

Figure 2:
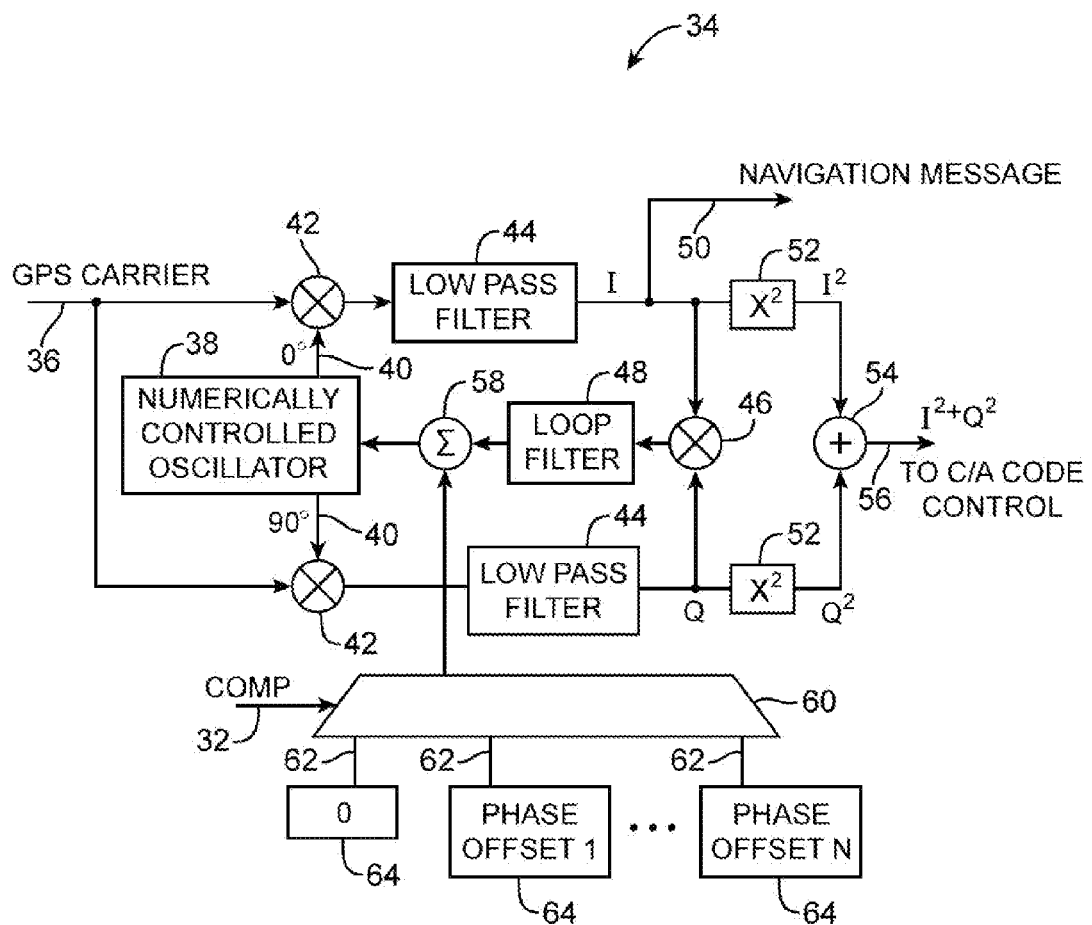
FIG. 2 is a circuit diagram of a Global Positioning System receiver with phase offset compensation capabilities that may be used in an electronic device of the type shown in FIG. 1 in accordance with an embodiment of the present invention.

FIG. 2 shows illustrative GPS receiver circuitry with phase offset compensation circuitry that may be used in GPS receiver 26 of device 10 of FIG. 1. As shown in FIG. 2, GPS receiver circuitry 34 may have a control input line such as input line 32 that receives phase offset compensation control signal COMP from processing circuitry in transceiver 24.

Processing circuitry associated with transceiver 24 (FIG. 1) may issue control signals COMP in real time that direct circuitry 34 to produce phase offsets that compensate for offsets in the phase of received signals 19 (i.e., phase offsets in the signal GPS CARRIER on line 36) that are produced as a result of changes made to adjustable RF circuitry and antenna structures 28 (FIG. 1) in response to control signals ADJ.

The GPS signals on line 36 are provided to summers 42. Summers 42 also receive in-phase (0°) and quadrature (90°) signals from numerically controlled oscillator 38. The resulting outputs of summers 42 are low-pass filtered by filters 44 to produce corresponding in-phase (I) and quadrature (Q) signals. The I signal contains 50 Hz navigation messages that were impressed upon the GPS signal by GPS satellites 21. Squaring circuits 52 produce $I^2$ and $Q^2$ signals from the I and Q signals respectively. The $I^2$ and $Q^2$ signals are summed by summer 52 and the resulting signal on path 56 is provided to a course adjustment (C/A) code control circuit for use in processing PSK codes on the GPS carrier to produce location information.

Summer 46 receives the I and Q signals from low pass filters 44 and provides a corresponding feedback signal to numerically controlled oscillator 38 (forming a phase-locked loop).

To ensure that phase offsets can be subtracted from the GPS carrier to compensate for phase offsets that are created by adjustments to circuitry 28 of FIG. 1, a summer such as summer 58 may be imposed in the path between phase-locked loop filter 48 and numerically controlled oscillator (or, alternatively, summer 58 may be positioned upstream of loop filter 48). Summer 58 may have a first input that receives a digital control word from loop filter 48 and may have a second input that receives a digital word representing a phase offset parameter from the output of multiplexer 60.

Multiplexer 60 may be adjusted in real time in response to control signal COMP on path 32. Multiplexer 60 has multiple inputs 62 each of which is connected to a respective one of storage elements 64. Storage elements 64 may be, for example, registers, portions of a non-volatile memory circuit (e.g., a read-only memory array, an electrically erasable read-only memory array, programmable fuses, etc.), portions of a volatile memory circuit, etc. Each storage element 64 may be loaded with a respective phase offset value. A first of the storage elements may be loaded with a zero value (for use when no phase offset correction is needed). A second of the storage elements may be loaded with phase offset PHASE OFFSET 1. If desired, additional phase offset values may be stored in additional storage elements. The number of storage elements 64 and the number of corresponding inputs associated with multiplexer 60 that are used in a given GPS receiver depends on the number of different modes in which adjustable RF circuitry and antenna structures 28 operate.

Consider, as an example, a scenario in which circuitry 28 is adjustable between a first configuration and a second configuration. Circuitry 28 may include adjustable RF circuitry coupled between an antenna and transceiver 24. In a first mode of operation, circuitry 28 (e.g., the RF circuitry) may be placed in the first configuration to optimize wireless performance for transceiver 22 in a first communications band (e.g., the 800 and 900 MHz cellular bands). In a second mode of operation, circuitry 28 (e.g., the RF circuitry) may be placed in the second configuration to optimize wireless performance for transceiver 22 in a second communications band (e.g., the 1800, 1900, and 2100 MHz bands). Because the electrical characteristics of the radio-frequency path between the antenna and transceiver circuitry 22 are different in the first mode than in the second mode, there is a phase offset ($\Phi_1-\Phi_2$) that is imposed on the GPS carrier when switching between the first and second modes. This is because both the GPS signal and the signals for transceiver circuitry 24 pass through the radio-frequency circuitry.

To compensate for the phase offset ($\Phi_1-\Phi_2$) that is produced when switching circuitry 28 between the first and second operating modes, a first of storage elements 64 may be loaded with a digital offset value corresponding to no offset (zero offset) and a second of storage elements 64 may be loaded with a digital offset value having a magnitude equal to phase difference ($\Phi_1-\Phi_2$). Other equivalent arrangements may also be used, if desired. For example, a first of storage elements 64 may be loaded with a digital offset value corresponding to $\Phi_1$ and a second of storage elements 64 may be loaded with a digital offset value corresponding to $\Phi_2$, etc.

During operation of circuitry 20 in the first mode of operation, multiplexer 60 connects the output of the first storage element to summer 58. In this situation, the output of loop filter 48 is added to the zero offset from the first storage element. The corresponding control signal that is provided to the input of numerically controlled oscillator 38 is therefore unchanged. During operation of circuitry 20 in the second mode, multiplexer 60 connects the output of the second storage element 64 to summer 58. In this situation, a compensating phase offset ($\Phi_1-\Phi_2$) from the second storage element is added to the output of loop filter 48. The phase offset value that is added in this way serves to compensate for the change in phase of GPS carrier 36 that is induced by adjusting circuitry 28 when switching from the first mode to the second mode. The operation of GPS receiver circuitry 34 will therefore not be disrupted by the phase offset produced by adjusting circuitry 28 and will function accurately.

The value of the compensating phase offset ($\Phi_1-\Phi_2$) may be obtained by measuring device 10 or by making measurements on a representative electronic device or set of devices. Measured phase offset values may then be programmed into newly manufactured devices 10 as part of a calibration process (e.g., as part of loading firmware and other settings into device 10 during manufacturing). Once properly loaded with phase offset information, device 10 can be operated normally.

Figure 3:
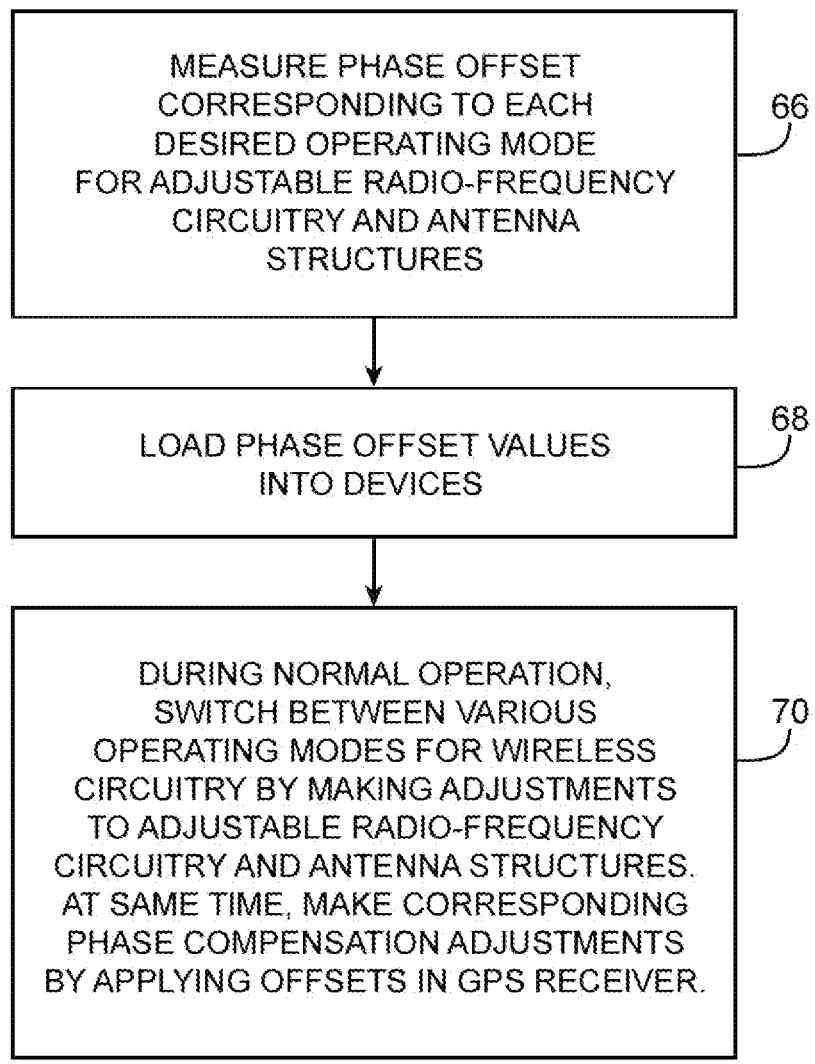
FIG. 3 is a flow chart of illustrative steps involved calibrating and operating an electronic device of the type shown in FIG. 1 that includes a Global Positioning System receiver with phase offset compensation capabilities in accordance with an embodiment of the present invention.

Illustrative steps involved in manufacturing and using an electronic device such as electronic device 10 of FIG. 1 in a system such as system 8 of FIG. 1 are shown in FIG. 3.

At step 66, device 10 or one or more representative devices of the same type as device 10 may be characterized using test equipment such as test equipment 12 of FIG. 1. During testing, device 10 may step through each of the possible operating modes that affect the phase of GPS signal 19 when passing through adjustable RF circuitry and antenna structures 28. In each different operating mode, transceiver circuitry 24 may issue a different corresponding control signal ADJ, thereby placing the adjustable RF circuitry and other adjustable components of circuitry 28 (e.g., adjustable antenna structures) into respective configurations. Each different configuration for circuitry 28 results in a different phase offset for GPS signals 19 that travel through circuitry 28. These phase shift values (e.g., $\Phi_1$, $\Phi_2$, etc.) may be gathered by test equipment 12 and processed for later use as compensating phase offset values.

At step 68, compensating phase offset values from tester 12 may be located into devices such as device 10 during manufacturing. Each device that is manufactured can be calibrated individually by using its own phase offset measurements as calibration settings or devices can be calibrated based on average phase offset values gathered by measuring a representative population of devices. Calibration equipment 12 or other suitable data loading equipment may be used to load the compensating phase offset values into the electronic devices. These values may be stored in storage circuitry in the electronic devices such as storage elements 64 of FIG. 2. If desired, the compensating phase offset data may be loaded into devices during firmware updates (e.g., wirelessly or when device 10 is tethered to a computer or other host).

At step 70, device 10 may be used to communicate wirelessly with network equipment 14 and may be used to receive GPS signals 19 from satellites 21. During normal operation, a user may move device 10. For example, a user in an automobile may move device 10 between different cells in a cellular network or may move device 10 between different countries or continents. Changes in the operating environment of device may also arise due to changes in the weather, changes in signal interference, changes in the orientation of device 10, changes in the local environment of device 10, etc. Different types of services may be provided by device 10 at different times. For example, a user may launch an application that sends and receives data over a remote data link. A user might also initiate a voice call or might send a text message. In some situations, a user might require the use of a local area network link.

Due to the influence of environmental and usage factors such as these, device 10 may need to switch between different communications bands that are supported by transceiver circuitry 22. When switching between bands or otherwise adjusting the mode of operation of wireless communications circuitry 20, changes may be made in adjustable RF circuitry and antenna structures 28 that optimize wireless performance for transceiver circuitry 22. For example, the path that is formed through radio-frequency circuitry may be changed as a function of the operating mode for device 10. Each change of this type may result in a different phase offset for received radio-frequency signals including the radio-frequency signals used by transceiver circuitry 22 and the GPS signals used by GPS receiver 26. As the mode of operation for wireless communications circuitry 20 changes, both circuitry 28 and the phase compensation circuitry of receiver 26 can be adjusted simultaneously by coordinating signals ADJ and COMP. The phase offsets imposed on the GPS signal can therefore be compensated and disruptions to the operation of GPS receiver 26 may be minimized.

The foregoing is merely illustrative of the principles of this invention and various modifications can be made by those skilled in the art without departing from the scope and spirit of the invention.

What is claimed is:

1. An electronic device, comprising:
  adjustable radio-frequency circuitry and antenna structures that are operable in a plurality of different modes;
  radio-frequency transceiver circuitry that transmits and receives radio-frequency signals through the adjustable radio-frequency circuitry and antenna structures; and
  satellite navigation system receiver circuitry that receives satellite navigation signals through the adjustable radio-frequency circuitry and antenna structures, wherein a phase offset is imposed on the received satellite navigation signals by the adjustable radio-frequency circuitry and antenna structures when switching between the different modes and wherein the satellite navigation system receiver circuitry uses at least one compensating phase offset value to compensate the received satellite navigation system signals for the imposed phase offset, and wherein the satellite navigation system receiver circuitry includes a multiplexer having a plurality of inputs and an output and further includes a plurality of storage elements each of which provides a respective compensating phase offset value to a respective one of the plurality of inputs.

2. The electronic device defined in claim 1 wherein the adjustable radio-frequency circuitry and antenna structures include an antenna and wherein the radio-frequency transceiver circuitry transmits and receives the radio frequency signals through the antenna and wherein the satellite navigation system receiver circuitry receives the satellite navigation signals through the antenna.

3. The electronic device defined in claim 1 wherein the radio-frequency transceiver circuitry and the satellite navigation system receiver circuitry are formed on at least one integrated circuit that issues first control signals that adjust the adjustable radio-frequency circuitry and antenna structures and that issues second control signals that adjust how the satellite navigation system receiver circuitry uses the compensating phase offset value.

4. The electronic device defined in claim 3 wherein the multiplexer is controlled by the second control signals.

5. The electronic device defined in claim 1 wherein the satellite navigation system receiver circuitry includes a summer and wherein the output of the multiplexer is connected to the summer.

6. The electronic device defined in claim 5 wherein the satellite navigation system receiver circuitry comprises a numerically controlled oscillator that receives output from the summer.

7. A method for operating an electronic device that includes an antenna structure, transceiver circuitry that includes a satellite navigation system receiver that receives satellite navigation system signals, and adjustable radio-frequency circuitry interposed between the antenna structure and the transceiver circuitry, comprising:
  storing calibration settings in the satellite navigation system receiver wherein each calibration setting includes a compensating phase offset value;
  adjusting the adjustable radio-frequency circuitry to optimize performance of the transceiver circuitry, wherein adjusting the adjustable radio-frequency circuitry produces phase offsets in the satellite navigation system signals; and
  while adjusting the adjustable radio-frequency circuitry, adjusting the satellite navigation system receiver by selecting one of the stored calibration settings to compensate for the phase offsets.

8. The method defined in claim 7 wherein adjusting the adjustable radio-frequency circuitry comprises operating the adjustable radio-frequency circuitry in at least first and second modes of operation each of which imposes a different associated phase offset on the satellite navigation system signals.

9. The method defined in claim 8 wherein adjusting the satellite navigation system receiver comprises selecting a first compensating phase offset value for the satellite navigation system receiver when the adjustable radio-frequency circuitry is operated in the first mode and selecting a second compensating phase offset value that is different than the first compensating phase offset value for the satellite navigation system receiver when the adjustable radio-frequency circuitry is operated in the second mode.

10. The method defined in claim 8 wherein the transceiver circuitry comprises cellular telephone transceiver circuitry that handles a first cellular telephone communications band in the first mode and that handles a second cellular telephone communications band in the second mode that is different than the first cellular telephone communications band, wherein adjusting the adjustable radio-frequency circuitry comprises adjusting the adjustable radio-frequency circuitry to optimize performance for the cellular telephone transceiver in the first cellular telephone communications band when operating in the first mode and comprises adjusting the adjustable radio-frequency circuitry to optimize performance for the cellular telephone transceiver in the second cellular telephone communications band when operating in the second mode.

11. Apparatus, comprising:
an antenna;
radio-frequency transceiver circuitry that includes a transceiver and a satellite navigation system receiver; and
adjustable radio-frequency circuitry that is interposed between the antenna and the radio-frequency transceiver circuitry and that is operable in a plurality of different modes, wherein:
the satellite navigation system receiver receives satellite navigation signals through the antenna and the adjustable radio-frequency circuitry;
a phase offset is imposed on the satellite navigation signals by the adjustable radio-frequency circuitry when the adjustable radio-frequency circuitry switches between the different modes;
when the adjustable radio-frequency circuitry is operating in a first mode, the satellite navigation system receiver uses a first predetermined compensating phase offset value corresponding to the first mode to compensate the received satellite navigation system signals for the imposed phase offset; and
when the adjustable radio-frequency circuitry is operating in a second mode, the satellite navigation system receiver uses a second predetermined compensating phase offset value corresponding to the second mode to compensate the received satellite navigation system signals for the imposed phase offset.

12. The apparatus defined in claim 11 wherein the transceiver and the satellite navigation system receiver are configured to issue first control signals that adjust the adjustable radio-frequency circuitry.

13. The apparatus defined in claim 12 wherein the transceiver and the satellite navigation system receiver are configured to issue second control signals that adjust how the satellite navigation system receiver uses the compensating phase offset values.

14. The apparatus define in claim 13 wherein the satellite navigation system receiver includes a multiplexer that is controlled by the second control signals.

15. The apparatus defined in claim 14 wherein the multiplexer has a plurality of inputs and an output and wherein the satellite navigation system receiver includes a plurality of storage elements each of which provides a respective compensating phase offset value to a respective one of the plurality of inputs.

16. The apparatus defined in claim 15 wherein the satellite navigation system receiver comprises:
a summer; and
a numerically controlled oscillator that receives output from the summer, wherein the output of the multiplexer is connected to the summer.

17. The apparatus defined in claim 11 wherein the transceiver comprises a cellular telephone transceiver.

18. An electronic device, comprising:
adjustable radio-frequency circuitry;
radio-frequency transceiver circuitry that transmits and receives radio-frequency signals through the adjustable radio-frequency circuitry and that generates a compensating phase offset control signal;
a receiver circuit which receives a satellite navigation system signal through the adjustable radio-frequency circuitry; and
a multiplexing circuit which receives the compensating phase offset control signal and applies a corresponding compensating phase offset to the receiver circuit to compensate the receiver circuit for a phase offset in the satellite navigation system signal, wherein the phase offset is generated from adjustments in the adjustable radio-frequency circuitry.

19. The electronic device defined in claim 18 wherein the receiver circuit includes a numerically controlled oscillator, wherein the multiplexer has a plurality of inputs each of which receives a respective compensating phase offset value, wherein the multiplexer has a control input that receives the compensating phase offset control signal, and wherein the multiplexer has an output at which the multiplexer supplies a selected one of the compensating phase offset values for the receiver circuit to use in producing the compensating phase offset.

20. The electronic device defined in claim 19 wherein the receiver circuit further comprises a summer that is interposed between the output of the multiplexer and the numerically controlled oscillator.

21. The electronic device defined in claim 20 wherein the multiplexing circuit further comprises a plurality of storage elements each of which provides a respective one of the compensating phase offset values to a respective one of the plurality of inputs.

* * * * *